Aug. 16, 1949.  R. G. HOLT  2,479,359
UNLOADING VALVE
Filed Oct. 6, 1943  2 Sheets-Sheet 2
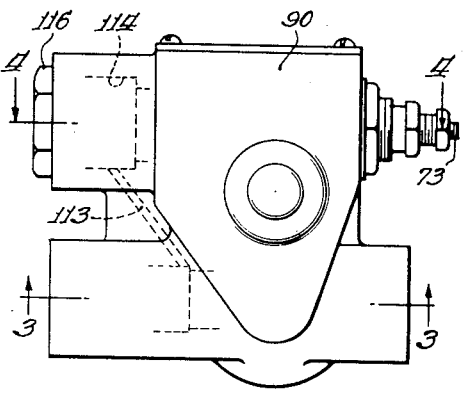
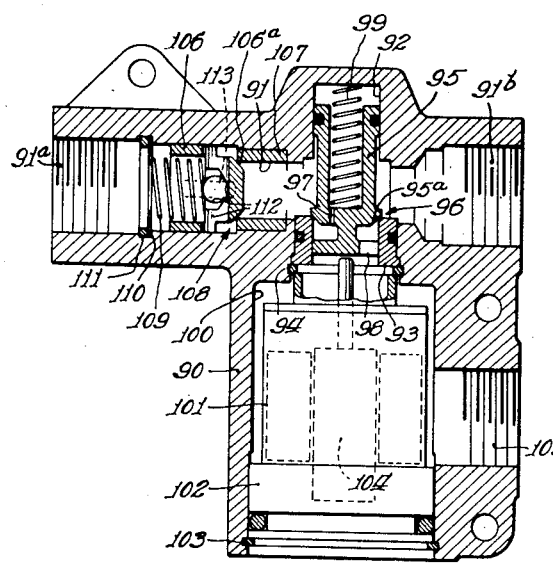
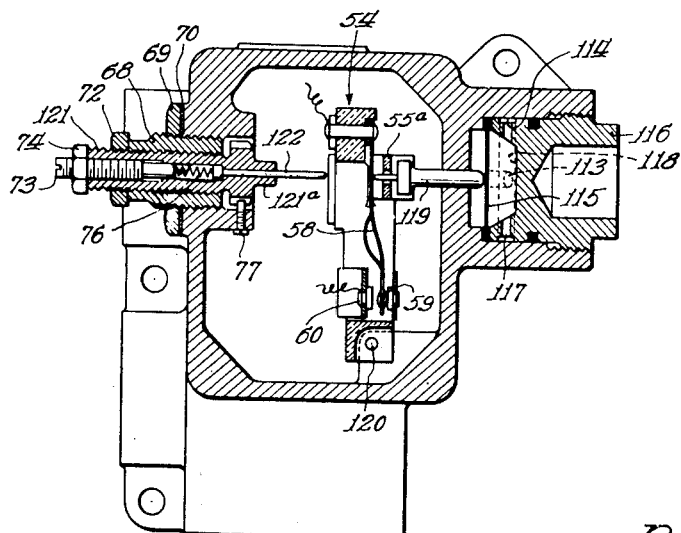
Inventor:
Ray G. Holt
By: Edward P. Fitzbaugh
Atty.

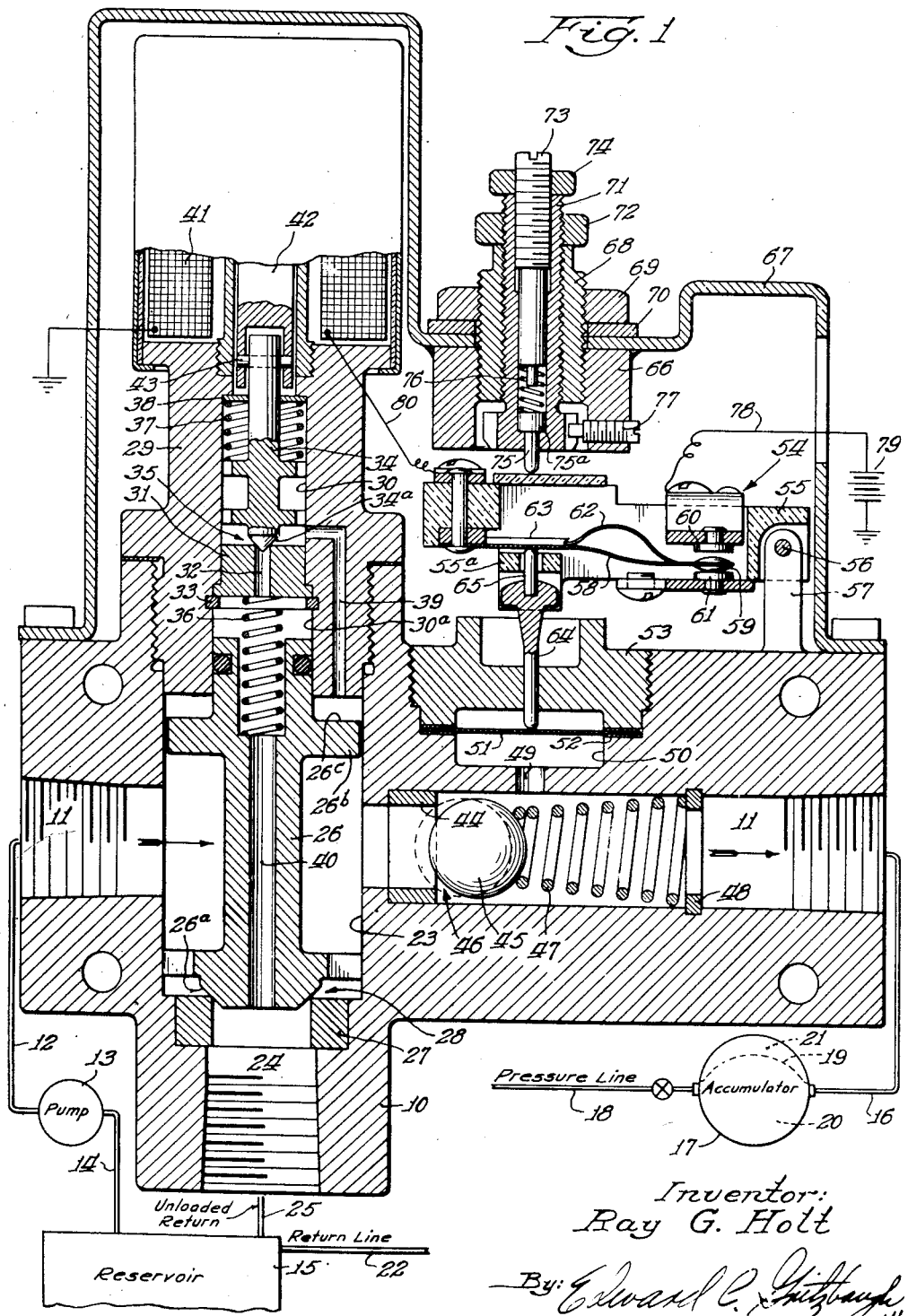

Patented Aug. 16, 1949

2,479,359

UNITED STATES PATENT OFFICE 2,479,359

UNLOADING VALVE

Ray G. Holt, Euclid, Ohio, assignor, by mesne assignments, to Borg-Warner Corporation, Chicago, Ill., a corporation of Illinois Application October 6, 1943, Serial No. 505,103

8 Claims. (Cl. 137—139)

My invention relates to unloading valve systems for fluid pumps which function to maintain fluid under pressure in a fluid accumulator connected with a pump between maximum and minimum limits. My invention relates more specifically to such unloading valve systems particularly suitable for use on aircraft.

In an aircraft, there are many instrumentalities operated by fluid under pressure, such as the retractable landing gear. For the proper functioning of these instrumentalities, the fluid pressure applied thereto must be maintained between predetermined maximum and minimum limits. The pressure is usually provided by a fluid pump which is directly connected with a motor of the aircraft and the capacity of which varies with the rate at which it is driven. If such a pump is used without any pressure regulating mechanism, continuous operation of the pump produces overloading of the pump resulting in a loss of efficiency and undesirable wear on the elements of the pump and produces a fluid pressure higher than the desired maximum pressure, resulting in improper operation of the fluid operated instrumentalities on the aircraft.

It has heretofore been proposed to provide a valve mechanism operatively interposed between a pump and a fluid accumulator for regulating the fluid pressure in the accumulator. The accumulator is adapted to be selectively connectible with the fluid pressure operated instrumentalities on an aircraft. This valve mechanism comprises a relief valve which permits the flow of fluid to the accumulator until the required pressure is established and thereafter opens to permit the pump to discharge freely to relieve the pump of its load. The valve mechanism as a whole is responsive to the fluid pressure in the accumulator due to certain mechanical connections between a member movable in response to changes in fluid pressure thereon and the valve.

It has been found with such a valve mechanism comprising such mechanical connections that the relief valve is quite sluggish in operation and that the valve mechanism as a whole is ineffective to control the pressure differential in the accumulator within refined limits.

It is a principal object of my invention to provide an improved unloading valve arrangement which comprises no sluggishly moving parts and which is effective to control the pressure differential in a fluid accumulator within refined limits.

More particularly it is an object of my invention to provide an improved unloading valve arrangement which includes an electrically operated valve for unloading the fluid pump and actuated by the changes of fluid pressure in the accumulator.

It is another object of my invention to provide an improved unloading valve arrangement including a relief valve which requires little energy to operate, even though high fluid pressures may be used.

It is still another object to provide an improved unloading valve arrangement including an electric solenoid valve operator which opens the valve when energized and which is so constructed that the solenoid is effectively cooled.

In its preferred forms, my invention comprises a valve casing having a conduit extending therethrough which is adapted to connect a fluid accumulator and a fluid pump, a valve for providing a relief outlet for said conduit, a spring biased check valve between the relief valve and accumulator, a diaphragm in communication with the conduit between the check valve and accumulator and responsive to the differences in fluid pressure in this portion of the conduit, a switch actuated by movement of the diaphragm due to changes in fluid pressure thereon, and an electric solenoid for controlling the relief valve and connected with the switch, with the arrangement being such that the relief valve is opened when the fluid pressure in the conduit between the check valve and accumulator reaches the selected maximum value and the valve is closed when the fluid pressure in this portion of the conduit reaches the selected minimum value.

My invention consists of the novel constructions, arrangements and devices to be hereinafter described and claimed for carrying out the above stated objects and such other objects as will appear from the following detailed description of certain preferred embodiments, wherein:

Fig. 1 is a vertical sectional view of an unloading valve mechanism embodying the principles of my invention;

Fig. 2 is a plan view of an unloading valve mechanism constituting a modification of my invention;

Figs. 3 and 4 are sectional views taken on lines 3—3 and 4—4 respectively of Fig. 2 in the directions indicated; and Fig. 5 is a wiring diagram of an electrical circuit in the embodiment of the invention shown in Fig. 2.

Like characters of reference designate like parts in the several views.

Referring now to Fig. 1 of the drawings, the illustrated unloading valve mechanism comprises a valve body or casing 10 which is provided with a conduit 11 extending therethrough. The conduit is preferably threaded at each end and is adapted to be connected at one end by means of a pressure line 12 with a pump 13. The pump 13 is connected by a fluid line 14 with a reservoir 15 for the fluid, such as oil, which is used in actuating the various fluid pressure operated instrumentalities on an aircraft. The conduit 11 at its other end is adapted to be connected by a pressure line 16 with a fluid pressure accumulator 17 which in turn is connected with a pressure line 18 for providing fluid under pressure to any of the fluid pressure operated instrumentalities of the aircraft. The accumulator may be of any suitable type and may comprise a diaphragm 19 of resilient material disposed in a container and providing on one side a liquid chamber 20 and on the other side an air chamber 21. The accumulator functions to maintain the fluid in the lines 16 and 18 under pressures corresponding to the pressure which is put on the air in the chamber 21 by liquid having been pumped into the liquid chamber 20 of the accumulator, in accordance with the well understood principles of operation of such accumulators. A return line 22 is provided for returning the fluid used to operate the various pressure operated instrumentalities on the aircraft to the reservoir 15.

The casing 10 is provided with a valve chamber 23 in communication with the conduit 11 and extending substantially at right angles thereto. A conduit 24 is provided in the casing 10 which may communicate with the valve chamber 23. The conduit 24 is preferably threaded at its end and is adapted to be connected by means of a return line 25 with the reservoir 15. A valve piston 26 having a tapered end portion 26a is slidably disposed in the chamber 23. A ring 27 is fitted in the casing 10 between the conduit 24 and chamber 23, and the ring provides a seat for the tapered end 26a of the valve piston 26 to provide with the piston a relief valve 28. The arrangement is such that when the valve piston 26 is seated on the ring 27, the valve 28 is closed and the chamber 23 and conduit 24 are out of communication. When the valve piston 26 is off the ring 27, the valve 28 is open whereby the chamber 23 and the conduit 24 are in communication, and the conduit 24 provides a relief opening through which fluid in the chamber 23 and conduit 11 may freely drain to the reservoir 15.

A casing 29 provided with a chamber 30 is in threaded engagement with the casing 10, as shown. The valve piston 26 has its upper end disposed in a lower portion 30a of the chamber 30 and slides therein when the piston 26 moves in the chamber 23. A member 31 having a central bore 32 is disposed in the chamber 30 and is held in place by a retaining ring 33. A valve piston 34 is slidably disposed in the chamber 30 above the member 31. The piston 34 is provided with a tapered lower end 34a which is adapted to fit in the bore 32, and the member 31 thus forms a seat for the end 34a of the piston 34. The valve piston 34 and member 31 together form an auxiliary valve 35 for purposes hereinafter to be described. The valve 28 is normally held in closed condition by a spring 36 acting between the seat forming member 31 and the valve piston 26, and the valve 35 is also normally held in such condition by means of a spring 37 acting between the valve piston 34 and a washer 38 fitting on a suitable ledge in the hollow 30.

The valve piston 26 is provided with a portion 26b adjacent the upper end of the piston, and this portion of the piston is slightly smaller in diameter than the chamber 23. There is thus a small clearance or a restricted passage between the piston portion 26b and the walls of the chamber 23 such that fluid under pressure from the conduit 11 may flow around the piston portion 26b to an upper surface 26c of the piston 26. The casing 29 is provided with a duct 39 connecting the chamber 23 above the surface 26c with the chamber 30 above the seat forming member 31. The valve piston 26 is provided with a central bore 40 extending from its upper end to its lower end and which is, as shown, always in communication with the conduit 24 in the casing 10. The duct 39, the valve 35, the bore 32, and the bore 40 provide a passage, when the valve 35 is open, for draining fluid under pressure between the surface 26c and the lower end of the casing 29 to the return line 25, as is apparent.

It will be observed from the drawing that the lower portion 30a of the chamber 30 in which the upper portion of the piston 26 slides is of substantially the same diameter as the opening in the seat forming ring 27. It will thus be apparent that if the same fluid pressure is on all the surfaces of the valve 26 in the chamber 23 including the surface 26c, the valve piston 26 when closing the valve 28 is substantially balanced whereby the fluid pressure in the chamber tends neither to press the piston 26 tighter on the seat forming member 27 or to open the valve 28, since due to the bore 40, the top face of the piston 26 and also the portion of the bottom of the piston within the opening of the ring 27 are at the same pressure. The spring 36 thus functions as the sole means holding the piston 26 on the seat forming member 27. The piston 26 may be moved upwardly against the action of the spring 36 to open the valve 28 by relieving the fluid pressure on the piston surface 26c by means of the duct 39 and valve 35 as will be hereinafter more fully described.

An electric solenoid 41 is disposed on the upper end of the casing 29, and the solenoid is provided with an armature 42 movably disposed therein. The armature is connected with the valve piston 34 by means of a pin 43, and the arrangement is such that when the solenoid 41 is energized, the armature 42 and thereby the valve piston 34 are drawn upwardly to open the valve 35.

A sleeve 44 is provided in the conduit 11 fitting against a suitable abutment in the conduit and between the chamber 23 and the right end of the conduit 11, and a ball 45 is provided which is adapted to block the internal opening of the sleeve 44. The sleeve 44 provides a seat for the ball 45, and the ball and sleeve together form a check valve 46 which functions to prevent a flow of fluid from the right end of the conduit 11 to the chamber 23 but allows a flow of fluid in the opposite direction. A spring 47 is provided between the ball 45 and a retaining ring 48 fitting in a suitable annular indentation in the conduit 11, and the spring functions to urge the ball 45 against the sleeve 44 to close the valve 46.

The casing 10 is provided with a short duct 49 in communication with the conduit 11 between the sleeve 44 and ring 48 and in communication at its other end with a chamber 50 formed in the casing 10. The chamber 50 is closed by a diaphragm 51 seated on a ledge 52 provided in the casing 10 about the chamber 50, and the diaphragm is held in place by means of a cap member 53 threaded into a cavity formed in the casing 10 of which the ledge 52 and chamber 50 are parts. The diaphragm 51 is of thin sheet metal and is responsive to changes in the fluid pressure in the chamber 50, and of course in that portion of the conduit 11 between the check valve 46 and the right end of the conduit 11, in that the diaphragm 51 moves, particularly at its center, in response to such fluid pressure changes.

Movements of the diaphragm 51 at its center due to changes in fluid pressure in the chamber 50 are utilized for actuating in an electric snap switch 54. The switch 54 comprises a switch body 55 of insulating material which is swingably disposed about a pin 56 fixed in an upwardly extending arm portion 57 of the casing 10. A switch arm 58 is fixed at one end with respect to the switch body 55 and is provided at its other end with a switch contact 59. The switch contact 59 is adapted to be brought into contact with a stationary contact 60 or a stop 61. A pair of spring arms 62 (one being shown in the drawing) are provided to extend between the portion of the arm 58 carrying the contact 59 and a member 63 fixed with respect to the switch body 55. A pin 64 carrying another pin 65 as shown is provided for transmitting the movement of the diaphragm 51 from its center to the switch arm 58. The pin 64 extends through a suitable opening in the cap member 53, and the pin 65 extends through an opening in a portion 55a of the switch body 55. The switch arrangement is such that when the pins 64 and 65 are moved upwardly by the diaphragm 51, the switch arm 58 is moved accordingly, and the contact 59 moves with a snap action, due to the springs 62, into contact with contact 60. When the pins 64 and 65 again move downwardly with the center of the diaphragm, the contact 59 moves with a snap action out of contact with the contact 60. The switch 54 is of well known construction, and assuming that there is no swinging movement about the pivot 56 by the switch body 55, only a small movement of pins 64 and 65, on the order of .001 inch, is required to move the contact 59 into contact with the upper contact 60.

Adjusting means is provided for varying the action of the switch 54 and comprises a member 66 fixed to a housing 67 which is provided for the switch 54 and solenoid 41. A sleeve 68 is threaded into the member 66, and a locknut 69 and washer 70 are provided fitting over the sleeve on its upper end. Another sleeve 71 is threaded into the sleeve 68, and a locknut 72 is provided on the outer end of this sleeve. A screw 73 is threaded into the sleeve 71, and a locknut 74 is provided on the upper end of the screw. A plunger 75 is slidably disposed in the sleeve 71 at its lower end and is provided with an enlarged end 75a adapted to abut against an appropriate ledge in the sleeve to prevent the movement of the plunger out of the sleeve. A spring 76 is provided between the screw 73 and the plunger 75, as shown. The plunger 75 is adapted to bear against a part of the switch 54, and, as is apparent, the plunger functions with the spring 76 to yieldingly limit the upward swinging movement of the switch 54 about the pivot 56. A screw 77 extends through the member 66 and into a longitudinal slit in the sleeve 71, and the screw 77 functions to prevent rotation of the sleeve 71 but allows longitudinal movement thereof. The screw threads on the inside and the outside surfaces of the sleeve 68 are in the same direction but have a different pitch. The screw 73, the sleeve 71 and the plunger 75 may thus be moved upwardly or downwardly as a unit simply by turning the sleeve 68, and a relatively small upward or downward movement may be obtained by turning the screw 68 a relatively large number of turns, due to the differential thread construction on the screw 68. The screw 73 may be moved in the sleeve 71 to decrease or increase the force of the spring on the plunger 75, as is apparent. The locknuts 69, 72 and 74 function to maintain the parts 68, 71 and 73 in the desired relation to each other.

The contact 60 is connected by a lead 78 with a battery 79 which is grounded as shown. The contact 59 and switch lever 58 are connected by a lead 80 with the solenoid 41, and the solenoid is grounded as shown. It is thus apparent that the switch 54, including the contacts 59 and 60, is connected in series with the battery 79 and the solenoid 41.

The unloading valve arrangement operates to unload the pump 13 and allow it to discharge freely through the conduit 24 and return line 25 when the fluid pressure in the conduit 11 between the check valve 46 and the accumulator 17 reaches a certain selected maximum value, and the arrangement functions to close the relief valve 28 and cause fluid under pressure from the pump to flow through the conduit 11 and into the accumulator 17 when the pressure in the conduit 11 between the check valve 46 and the accumulator decreases to a certain selected minimum value. When the fluid pressure in the accumulator is below the selected maximum value and the pump is discharging through the conduit 11 into the accumulator, the parts of the valve arrangement are substantially as shown in the figure. Under these conditions, the pump draws fluid from the reservoir 15 through the line 14 and discharges fluid under pressure through the line 12 and into the conduit 11, through the chamber 23, the check valve 46 and the pressure line 16 to the accumulator 17 for increasing the fluid pressure in the accumulator.

When the fluid pressure in the accumulator and in the conduit 11 increases, the diaphragm 51 at its center carrying pins 64 and 65 moves upwardly, and when the pressure in the conduit 11 has increased to reach the selected maximum value, the diaphragm at its center has moved upwardly a predetermined distance sufficient for actuating the switch 54 to bring the contacts 59 and 60 together. During this upward movement of the pins 64 and 65, the switch body 55 has pivoted about the pin 56 against the action of the spring 76, and when the contacts 59 and 60 move together, the enlarged end of the plunger 75 is out of contact with the ledge in the sleeve 71 provided for limiting the outward movement of the plunger 75. When the circuit through the switch 54 is thus completed, current flows from the battery 79 through the contacts 59 and 60 and through the solenoid 41. Upon such energization of the solenoid, the armature 42 is moved upwardly against the action of the spring 37 to open the valve 35. The valve 35 when open functions to allow any fluid under pressure between the surface 26c of the valve piston 26 and the lower end of the casing 29 to flow through the conduit 39, the bore 32 and the bore 40 to the conduit 24 and thereby to the reservoir 15.

Upon such relief of fluid pressure on surface 26c, the valve piston is unbalanced and the fluid under pressure discharged by the pump 13 functions to move the piston upwardly against the action of the spring 36 to open the valve 28. Fluid discharged by the pump 13 through the line 12 into the conduit 11 is then freely drained through the open valve 28 and through the conduit 24 and line 25 to the reservoir 15. When the valve 28 is thus opened, the check valve 46 closes to maintain the fluid pressure in the accumulator. The valve 28 remains in closed condition as long as contacts 59 and 60 are together.

Upon a decrease of fluid pressure in the accumulator and in the conduit 11 between the check valve 46 and the accumulator, due to the use of fluid under pressure through the line 18 for actuating any of the fluid pressure operated instrumentalities on the aircraft, the diaphragm 51 at its center moves downwardly. The pins 64 and 65 move downwardly with the diaphragm 51 and exert a decreasing amount of force on the switch arm 58. When the fluid pressure in the accumulator reaches the selected minimum value, the switch 54 snaps to open condition separating contacts 59 and 60, due to the inherent resiliency of the switch arms. The switch body 55, of course, moves along, to a certain extent at least, with the pins 64 and 65, due to the action of the spring 76 and plunger 75.

When the switch 54 is thus opened, the solenoid 41 in series with the switch is thereby deenergized, and the armature 42 and valve piston 34 move to their positions as shown in the figure under the action of the spring 37. The valve 35 is thereby closed and prevents any further flow of fluid through the duct 39 from the portion of the chamber 23 above the valve surface 26c. Fluid under pressure from the pump 13 seeps through the restricted space between the valve portion 26b and the walls of the chamber 23, and when the fluid pressure on the surface 26c becomes substantially the same as the fluid pressure on the other surfaces of the valve piston 26 in the chamber 23, then the valve piston 26 moves downwardly under the action of the spring 36 to close the valve 28. The pump 13 then again functions to discharge fluid through the conduit 11 past the check valve 46 and into the accumulator 17 to raise the pressure therein.

The differential between the maximum and minimum pressure limits at which the unloading valve arrangement operates may be adjusted by adjusting the screw 73 to render the spring 76 more or less effective on the plunger 75. If the spring 76 is rendered less effective by moving the screw 73 upwardly, then the diaphragm 51 at its center must move through a greater distance in order to cause the switch 54 to close since with the upward movement of the pins 64 and 65, the switch body 55 will turn through a greater angle, and the differential between the actuating pressures for the switch is greater. If the spring 76 is made more effective by moving the screw 73 downwardly and compressing the spring between the screw and plunger 75, then the diaphragm 51 at its center may move a smaller distance in order to close the switch 54 since there is greater resistance to the pivoting of the switch body 55 about the pivot 56, and the differential between the actuating pressures for the switch 54 is made less. Both the maximum and minimum switch actuating fluid pressures may be made simultaneously greater or less by turning the sleeve 68. If the sleeve 68 is turned such as to move the sleeve 71 downwardly, both of the switch actuating pressures are made less, since the diaphragm 51 need not be in as greatly flexed a condition for either opening or closing the switch 54. Conversely, if the sleeve 68 is turned so as to move the sleeve 71 upwardly, then both the maximum and minimum switch actuating pressures are increased, since the diaphragm 51 must be in a more greatly flexed condition in order to open or close the switch 54.

The modified unloading valve arrangement shown in Figs. 2, 3 and 4 comprises a valve casing 90 provided with a conduit 91 extending therethrough. The conduit 91 is threaded at each of its ends 91a and 91b and is adapted to have its end 91a connected with the pressure line 16 leading to the accumulator 17 as shown in Fig. 1 and to have its end 91b connected with the fluid supply line 12 from the pump 13 as shown in Fig. 1.

The casing 90 is provided with a valve chamber 92 in communication with and extending substantially perpendicularly to the conduit 91. A sleeve 93 is disposed at the lower end of the chamber 92, and the sleeve is fixed in the casing by means of a retainer ring 94. A valve piston 95 is slidably disposed in the chamber 92, and a lower portion of the piston 95 is slidably disposed in the sleeve 93, as shown. The piston 95 is provided with a tapered seat portion 95a, and the sleeve 93 forms a seat for the piston portion 95a. The sleeve 93 and piston 95 thus together form a relief valve 96 for the conduit 91.

The piston 95 is provided with openings 97 and 98 therein whereby the upper end of the chamber 92 is in communication with the lower end of the piston 95. It will be observed that the internal diameter of the sleeve 93 is the same as the diameter of the chamber 92 at its upper end. Due to this fact and due to the presence of the openings 97 and 98, the valve piston 95 is substantially balanced with respect to fluid under pressure in the conduit 91, that is to say, fluid under pressure in the conduit 91 tends to neither move the piston 95 upwardly nor downwardly when the valve 96 is closed. A minimum of force is thus required to move the piston 95 upwardly off the sleeve 93 to open the valve 96 while there is fluid under pressure in the conduit 91. A spring 99 is provided between the piston 95 and the upper end of the chamber 92, and the spring functions to hold the piston 95 on the sleeve 93 to maintain the valve 96 in closed condition. Since the piston 95 is substantially balanced, the only force necessary to open the valve 96, as is apparent, is that force necessary to overcome the action of the spring 99.

The casing 90 is provided with a chamber 100 below the sleeve 93 and in communication therewith. An electric solenoid 101 is disposed in the chamber 100, and the solenoid is held in place in the chamber by means of a cap member 102 and a retaining ring 103 for the cap member. The solenoid 101 has an armature 104 slidably disposed therein which is so arranged that when the armature 101 is energized, the armature moves upwardly and into contact with the lower end of the valve piston 95 to move the valve piston away from the sleeve 93 to open the valve 96. The chamber 100 is in communication with an outlet 105 in the casing 90, and since the chamber 100 is in communication with the sleeve 93, any fluid flowing through the sleeve 93, when the valve 96 is open, flows through the chamber 100 and around the solenoid 101 to the outlet 105. The outlet 105 is preferably threaded and is adapted to be connected with the return line 25 as shown in Fig. 1. It will be appreciated that when the valve 96 is open due to energization of the solenoid 101, fluid flowing through the chamber 100 about the solenoid 101 has the function of cooling the solenoid to prevent the development of excessive temperatures therein.

A plunger 106 is slidably disposed in the conduit 91 between the chamber 92 and the end 91a of the conduit. The plunger has a tapered end 106a, and a sleeve 107 is fixed in the conduit such that the sleeve may act as a seat for the tapered end 106a. The sleeve 107 together with the plunger 106 forms a check valve 108. A spring 109 is provided between the plunger 106 and a washer 110 fixed in the conduit 91 by means of a retaining ring 111. The spring 109 functions, as is apparent, to yieldingly hold the tapered plunger end 106a on the seat formed by the sleeve 107. The plunger 106 is provided with a plurality of openings 112 therein, which when the plunger 106 is off the sleeve 107, allow the flow of fluid through the conduit 91 from the chamber 92 toward the end 91a of the conduit. The plunger 106 functioning with the sleeve 107 as the valve 108 checks any fluid flow through the conduit 91 in the direction from the conduit end 91a toward the chamber 92, as is apparent.

The casing 90 is provided with a duct 113 extending between a point in the conduit 91 to the left of the sleeve 107, as seen in Fig. 3, to a cavity 114 formed in the casing 90. A diaphragm 115, which is similar to the diaphragm 51 in the Fig. 1 embodiment of the invention with respect to the material employed therefor, is provided in the cavity 114 on a suitable ledge in the cavity, and a closure member 116 is provided for the cavity cooperating with the ledge to hold the diaphragm in place. The closure member 116 is provided with a plurality of openings 117 which communicate with a chamber 118 in the inner end of the closure member and also with the duct 113. It will be apparent that the duct 113, the openings 112 in the plunger 106 and the openings 117 in the closure member 116 form a fluid passage and allow the fluid under pressure in the portion of the conduit 91 between the sleeve 107 and the conduit end 91a to be impressed on the diaphragm 115. The diaphragm 115 thus will be responsive to changes in fluid pressure in this portion of the conduit.

A snap action switch 54, which is similar in construction to the snap action switch in the Fig. 1 embodiment of the invention, is provided. A pin 119 of insulating material is slidably disposed in a suitable opening in the casing 90 such that the pin bears on the diaphragm 115 substantially at its center, and the pin extends through the opening in the body portion 55a of the switch to bear on the switch arm 58. The pin 119 functions similarly to the pins 64 and 65 in the Fig. 1 embodiment to actuate the switch 54.

Means for adjusting the action of the switch 54 which in general is similar to the switch adjusting means shown in the Fig. 1 embodiment is provided. The adjusting means comprises a sleeve 68 threaded into the casing 90, another sleeve 121 similar to the sleeve 71 except for an extension 121a provided on its inner end, an adjusting screw 73, a washer 70, lock nuts 69, 72, and 74, a set screw 77 and a spring 76. A plunger 122 which is similar to the plunger 75 but is of greater length is provided for bearing on the switch 54. Except for the exceptions noted, the parts of the switch adjusting means are similar to those in the Fig. 1 embodiment of the invention, and the action of the switch 54 is adjusted in the same manner, the sleeve 68 being utilized for raising or lowering both the maximum and minimum switch actuating fluid pressures and the screw 73 being utilized for adjusting the differential between the maximum and minimum switch actuating pressures. The switch 54, and particularly the contacts 59 and 60, are connected in series with the electric solenoid 101 and with a grounded battery 123 as shown in Fig. 5, and the solenoid 101 is grounded at one end to complete an electric circuit for energizing the solenoid 101.

The embodiment of the invention illustrated in Figs. 2, 3 and 4 functions to regulate fluid pressure similarly to the Fig. 1 embodiment of the invention. When the fluid pressure in the portion of the conduit 91 between the sleeve 107 and the outlet 91a and in an accumulator connected with the outlet reaches a predetermined maximum value, the contacts 59 and 60 of the switch 54 are closed, and the solenoid 101 is thereby energized to open the valve 96. The check valve 108 thereafter closes to maintain the pressure in the portion of the conduit 91 between the sleeve 107 and the outlet 91a, and in the accumulator, and fluid entering the casing through the inlet 91b is discharged through the valve 96, the sleeve 93, the annular conduit 100 about the solenoid 101, and the outlet 105 to a reservoir connected therewith. When the fluid pressure decreases in the conduit 91 between the sleeve 107 and the outlet 91a, due to the operation of any of the fluid pressure operated instrumentalities on the aircraft, the diaphragm 115 is affected to open the switch 54, whereby the solenoid 101 is deenergized and the valve 96 is closed. Fluid from a pump connected with the inlet 91b thereafter flows through the conduit 91 to the accumulator connected with the outlet 91a to again raise the pressure therein.

The unloading valve arrangements of my invention advantageously are effective to control the pressure differential in an accumulator within refined limits. The unloading valves proper are actuated by electric operating means, and the valves operate without the sluggishness with which a valve operated solely by fluid pressure operates. The electric operating means in both the embodiments of the invention are of minimum size and power, since they do not in themselves operate against high fluid pressure to open the relief valves proper. In the Fig. 1 embodiment of the invention the solenoid 41 need only be powerful enough to actuate the auxiliary valve piston 34, while in the other embodiment of the invention, the valve piston 95 is balanced with respect to fluid pressure in the conduit 91 and may be operated with a minimum of power.

It will be understood that changes may be made without departing from the principles of the invention. For example, while I have disclosed the diaphragm 51 in the Fig. 1 embodiment of the invention and the diaphragm 115 in the Fig. 2 embodiment of the invention as being in communication with and under the direct influence of the fluid under pressure between the respective relief valves and the accumulator, it will be apparent that the diaphragms may instead be in communication with the air chamber 21 in the accumulator, since the pressure of air in the chamber 21 is substantially the same as the pressure of liquid in the chamber 20 of the accumulator. I therefore wish it to be understood that my invention is not to be limited to the constructions shown and described except only insofar as certain of the appended claims may be so limited.

I claim:

1. In a relief valve arrangement adapted to maintain fluid under pressure in a conduit between selected maximum and minimum limits, a valve casing having a conduit with inlet and discharge ports, a relief valve for providing a relief outlet for said conduit, a spring biased check valve in said conduit between the discharge port and said relief valve for preventing a reverse flow of fluid through said discharge port to the relief valve when the relief valve is open, a pressure responsive diaphragm in communication with the conduit between said check valve and the discharge port, an electric switch actuated by movement of said diaphragm due to changes in fluid pressure thereon, and an electric actuating means controlled by said switch for bodily moving said relief valve to unseated position said valve actuating means and said switch being such as to open said relief valve when the fluid pressure on the diaphragm reaches the selected maximum and to release said relief valve to permit the closing thereof when the fluid pressure on the diaphragm reaches the selected minimum.

2. In a relief valve arrangement adapted to maintain fluid under pressure in a conduit between selected maximum and minimum limits, a valve casing having a conduit with inlet and discharge ports, a relief valve in said casing for providing a relief outlet for said conduit, a spring biased check valve in said conduit between the discharge port and said relief valve for preventing a reverse flow of fluid through said discharge port to the relief valve when the relief valve is open, a diaphragm in communication with said conduit between said check valve and the discharge port and responsive to changes in fluid pressure in said conduit, a snap action switch actuated by movement of said diaphragm due to changes in fluid pressure thereon, a solenoid connected with said switch, and an armature in said solenoid adapted on movement thereof to actuate said relief valve, the arrangement being such that said armature moves to open said relief valve when the fluid pressure on the diaphragm reaches the selected maximum and to close said relief valve when the fluid pressure on the diaphragm reaches the selected minimum.

3. In a relief valve arrangement adapted to maintain fluid under pressure in a fluid conduit between selected maximum and minimum limits, a casing defining a conduit having inlet and discharge ports, a relief valve in said conduit for providing a relief outlet for the conduit and comprising a piston, said piston being substantially balanced whereby fluid under pressure in said conduit tends to neither open nor close the valve when the valve is closed, a check valve in said conduit between the discharge port and the relief valve for preventing a reverse flow of fluid from the discharge port to the relief valve when the relief valve is open, switch means including a flexible diaphragm responsive to pressure in said conduit between the check valve and the discharge port, and electric controlling means for bodily moving said relief valve to unseated position and connected with said switch means, said valve controlling means and switch means being such as to open said relief valve when the fluid pressure reaches the selected maximum in said conduit and to release the relief valve to permit the closing thereof when the fluid pressure reaches the selected minimum in the conduit.

4. In a relief valve arrangement adapted to maintain fluid under pressure in a fluid conduit between selected maximum and minimum limits, the combination of a casing defining a conduit having inlet and discharge ports, a relief valve for providing a relief outlet for said conduit, a check valve in said conduit between the discharge port and said relief valve for preventing a reverse flow of fluid from the discharge port to said relief valve when the latter valve is open, pressure responsive switch means responsive to fluid pressure in said conduit between said check valve and the discharge port, said relief valve comprising a valve piston disposed in said conduit and being arranged to open the valve under the action of fluid pressure at said inlet port when there is substantially no fluid pressure on a certain surface of the piston remote from said conduit and being adapted to close when there is fluid pressure applied to said surface, said certain piston surface being connected by a restricted passage with said conduit, an auxiliary valve for relieving fluid pressure on said certain piston surface, said restricted passage allowing fluid to flow therethrough from said conduit when said auxiliary valve is operated from open condition to closed condition whereby to apply fluid under pressure to said certain piston surface to close said relief valve, and an electric actuating means for bodily moving said auxiliary valve to unseated position and connected with said switch means, said valve actuating means and said switch means being such as to open said relief valve when the fluid pressure reaches the selected maximum in the conduit and to release the relief valve to permit the closing thereof when the fluid pressure reaches the selected minimum in the conduit.

5. In a relief valve arrangement adapted to maintain fluid under pressure in a fluid conduit between selected maximum and minimum limits, the combination of a valve casing having a conduit therein and a valve chamber in communication with the conduit, said conduit having inlet and discharge ports, a relief valve providing a relief outlet for said conduit and comprising a valve piston slidably disposed in said chamber and a seat at one end of the chamber and adapted to cooperate with one end of the piston, a spring-biased check valve in said conduit between the discharge port and said chamber for preventing a reverse flow of fluid from the discharge port to said relief valve when the latter valve is open, a pressure responsive diaphragm in communication with said conduit between said check valve and the discharge port, a snap action switch actuated by movement of said diaphragm due to changes in fluid pressure on the diaphragm, said relief valve piston having a certain surface remote from its end cooperating with said seat whereby the valve under the action of fluid pressure at said inlet port opens when there is substantially no fluid pressure on said surface and closes when there is fluid pressure applied to said surface, said relief valve piston fitting loosely in its chamber whereby fluid may restrictedly pass around the piston to said certain surface, an auxiliary valve for relieving fluid pressure on said certain valve surface, and a solenoid connected with said switch and having an armature for actuating said auxiliary valve, the arrangement being such that said relief valve opens when the fluid pressure reaches the selected maximum in said conduit between the check valve and discharge port and closes when the fluid pressure reaches the selected minimum in the conduit between the check valve and discharge port.

6. In a relief valve arrangement adapted to maintain fluid under pressure in a fluid conduit between selected maximum and minimum limits, a casing defining a conduit having inlet and discharge ports, a relief valve for providing a relief outlet for said conduit and comprising a valve piston, said piston being so arranged as to be normally substantially balanced under fluid pressure when the valve is closed whereby the fluid pressure tends to neither close nor open the valve and being adapted to be unbalanced for opening the valve when fluid pressure is relieved on a certain surface of the piston, spring means acting on said piston to maintain the valve closed, a check valve in said conduit between the discharge port and said relief valve for preventing a reverse flow of fluid from the discharge port to the relief valve when the latter valve is open, pressure responsive switch means responsive to pressure in said conduit between the check valve and discharge port, and electrically controlled means responsive to actuation of said switch means and including an auxiliary valve for relieving the fluid pressure on said certain surface of the valve piston whereby to open the relief valve against the action of said spring means when the fluid pressure reaches the selected maximum in the conduit and for restoring the fluid pressure to said certain piston surface whereby to again balance said piston and permit said spring means to close said valve when the fluid pressure reaches the selected minimum in the conduit.

7. In a relief valve arrangement adapted to maintain fluid under pressure in a fluid conduit between selected maximum and minimum limits, a casing defining a conduit having inlet and discharge ports, a relief valve in said conduit and comprising a piston and a seat for the piston, said valve providing a relief outlet for said conduit, said piston being axially alined with said relief valve and being substantially balanced whereby fluid under pressure in said conduit tends to neither open nor close the valve when the valve is closed, a check valve in said conduit between the discharge port and the relief valve for preventing a reverse flow of fluid from the discharge port to the relief valve when the relief valve is open, a fluid pressure responsive diaphragm in communication with said conduit between the check valve and discharge port, an electric switch actuated by movement of said diaphragm in response to changes of fluid pressure thereon, and an electric actuating means for said valve piston acting directly thereon and connected with said switch, said valve actuating means and switch being such as to open said relief valve when the fluid pressure reaches the selected maximum in the conduit and to release the relief valve to permit the closing thereof when the fluid pressure reaches the selected minimum in the conduit.

8. In a relief valve arrangement adapted to maintain fluid under pressure in a conduit between selected maximum and minimum limits, a valve casing having a conduit therein and a valve chamber in communiaction with the conduit, said conduit having inlet and discharge ports, a relief valve for providing a relief outlet for said conduit and comprising a valve seat and a valve piston slidably disposed in said valve chamber and adapted to cooperate with said seat, said piston being substantially balanced whereby fluid under pressure in said chamber and conduit tends to neither move the valve piston toward or from said valve seat when the valve is closed, a spring-biased check valve in said conduit between the discharge port and said relief valve for preventing a reverse flow of fluid from the discharge port to the relief valve when the relief valve is open, a fluid pressure responsive diaphragm in communication with said conduit between said check valve and the discharge port, a solenoid having a movable armature, said armature operatively connected with said piston and being thereby adapted to move the piston in said valve chamber between its valve opening and closing positions, and an electric snap action switch connected in circuit with said solenoid and adapted to be actuated by movement of said diaphragm due to fluid pressure changes thereon, the arrangement being such as to open said relief valve when the fluid pressure reaches the selected maximum on said diaphragm and to close the relief valve when the fluid pressure reaches the selected minimum on the diaphragm.

RAY G. HOLT.

REFERENCES CITED

The following references are of record in the file of this patent:

UNITED STATES PATENTS

| Number | Name | Date |
|---|---|---|
| 703,320 | White | June 24, 1902 |
| 722,302 | Holley | Mar. 10, 1903 |
| 891,568 | Runnion | June 23, 1908 |
| 1,110,567 | McAulay | Sept. 15, 1914 |
| 1,148,054 | Rosencrans | July 27, 1915 |
| 1,252,312 | Warren | Jan. 1, 1918 |
| 1,326,603 | Marshall | Dec. 30, 1919 |
| 1,451,481 | Vincent | Apr. 10, 1923 |
| 1,636,561 | Hazard | July 19, 1927 |
| 1,712,791 | Gallagher | May 14, 1929 |
| 1,911,530 | Raisch | May 30, 1933 |
| 2,004,793 | Montgomery | June 11, 1935 |
| 2,035,237 | Kushinsky | Mar. 24, 1936 |
| 2,214,817 | Harrington | Sept. 17, 1940 |
| 2,251,441 | Dillman | Aug. 5, 1941 |
| 2,312,877 | Campbell | Mar. 2, 1943 |
| 2,363,117 | Butter | Nov. 21, 1944 |
| 2,365,282 | Lester | Dec. 19, 1944 |